United States Patent [19]

Kremer et al.

[11] Patent Number: 4,540,058

[45] Date of Patent: Sep. 10, 1985

[54] APPARATUS FOR WEIGHING HEAVY LOADS

[75] Inventors: André Kremer; Marcel Wolwert, both of Luxembourg, Luxembourg

[73] Assignee: Paul Wurth S.A., Luxembourg

[21] Appl. No.: 592,791

[22] Filed: Mar. 23, 1984

[30] Foreign Application Priority Data

Mar. 23, 1983 [LU] Luxembourg .................... 84710

[51] Int. Cl.³ .................... G01G 21/02; G01G 21/12
[52] U.S. Cl. .................... 177/255; 177/DIG. 9; 308/1 R; 266/276
[58] Field of Search ............ 177/208, 255, DIG. 9; 308/1 R; 384/461, 608; 266/276

[56] References Cited

U.S. PATENT DOCUMENTS

| 4,062,415 | 12/1977 | Miller | 177/208 |
| 4,248,317 | 2/1981 | Rahav | 177/255 X |
| 4,436,293 | 3/1984 | Schmidt et al. | 266/165 X |

FOREIGN PATENT DOCUMENTS 2257009  6/1974  Fed. Rep. of Germany ...... 177/255

Primary Examiner—E. A. Goldberg
Assistant Examiner—Patrick W. Foster
Attorney, Agent, or Firm—Fishman & Dionne

[57] ABSTRACT

An apparatus is presented for weighing heavy loads, particularly those loads having to be laterally supported during the weighing operation. The weighing apparatus comprises a vertical column supported on its base by pressure cells and provided on its top surface with a support structure. This support structure retains the material to be weighed. A guide tube is provided coaxially around the column and a rotating sleeve with bearing elements is mounted between the column and the guide tube. A motor is mounted on the guide tube for rotating the sleeve during the weighing operation. The weighing apparatus is particularly well suited for use in conjunction with a casting ladle used in revolving turrets during continuous casting.

15 Claims, 2 Drawing Figures

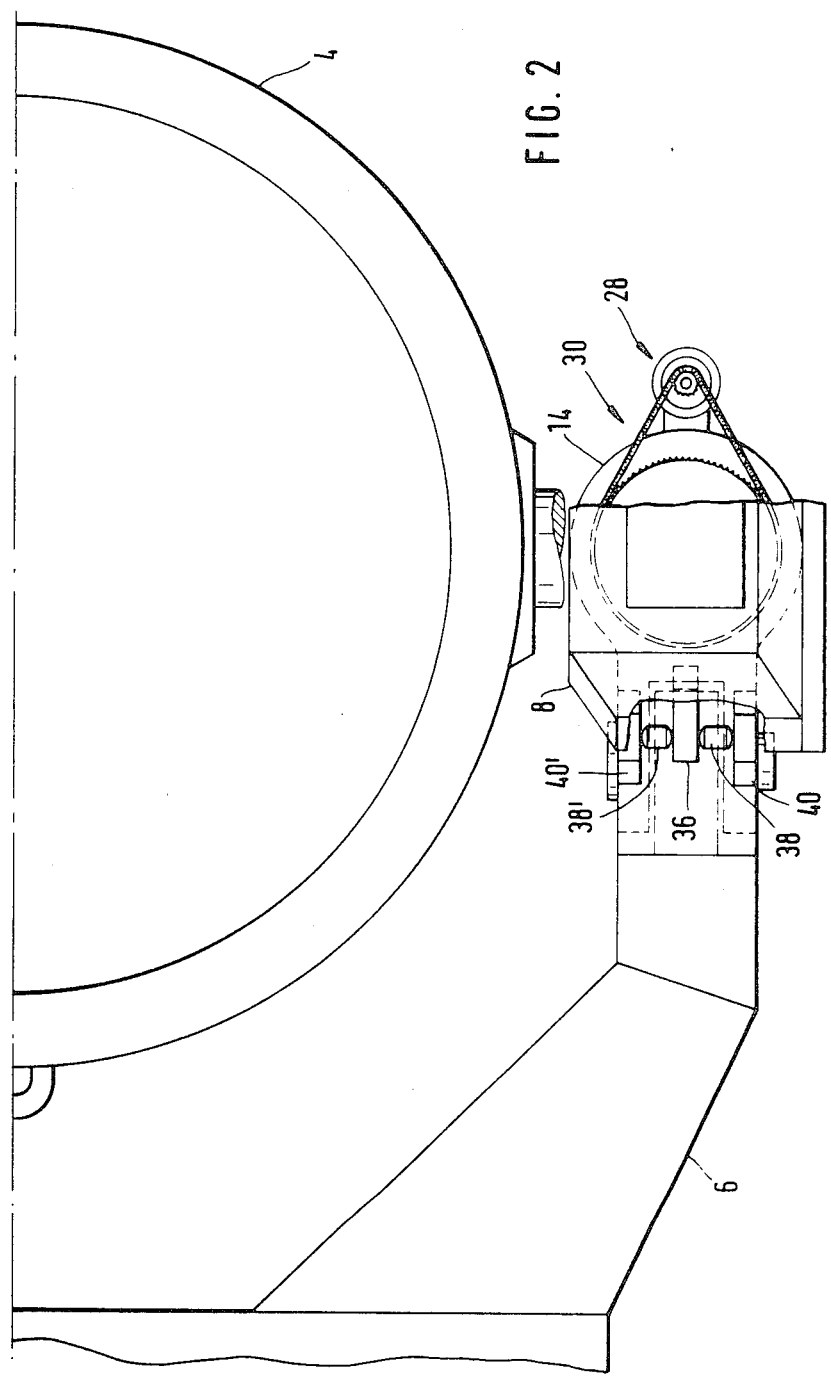

APPARATUS FOR WEIGHING HEAVY LOADS

BACKGROUND OF THE INVENTION

This invention relates to the field of weight measurement devices. More particularly, this invention relates to a weighing apparatus for those heavy loads necessitating lateral support during weighing, particularly where available space on either side of the load is relatively restricted.

While the present invention is generally suitable for the above stated purpose, it is particularly well suited for the weighing of casting ladles used in revolving turrets during continuous casting, and will therefore be described in connection with that particular field of application.

Revolving ladle turrets, as described in U.S. patent application Ser. No. 439,354, now U.S. Pat. No. 4,436,293, which is assigned to the assignee hereof and incorporated herein by reference, provide a means of quasi continuous casting. In Pat. No. 4,436,293, one of the two casting ladles used in the turret occupies the operating, i.e., casting position, while the other ladle occupies the stand-by position. As explained in detail in the patent, at any given time, it is important to know the liquid level in the operating ladle, so as to accurately determine the point at which the ladle has been emptied. As a result, ladles are typically suspended in vertically movable frames or similar supports, which in turn rest on pressure cells.

Although suitable for its intended purposes, one problem present in the above apparatus for determining the weight of a ladle, is that the directional force of the weight of the ladle usually does not coincide with the vertical axis of the pressure cell (due to the non-uniform distribution of the mass and contents of the ladle). As a result, horizontal force components develop between the guides of the frame and the overhanging suspension arms of the revolving turret which act to falsify the overall results of the weighing operation.

In the above described U.S. Pat. No. 4,436,293, these horizontal forces are compensated, for example, by horizontal laminations provided between the vertically movable frames and the overhanging arms of the turrets. It has been found that this lamination system reduces the weighing error to between about 1% to about 0.1%. Although this degree of accuracy may be regarded as highly satisfactory, particularly in view of the rough conditions under which this weighing process is carried out, there is nevertheless a need for still greater weighing accuracy.

SUMMARY OF THE INVENTION

The above discussed and other problems of the prior art are overcome or alleviated by the weighing apparatus of the present invention wherein weighing error is reduced to less than 0.1%. In accordance with the present invention, a weighing apparatus is provided for those heavy loads necessitating lateral support during the weighing operation, particularly where available space on either side is relatively restricted. The improved weighing apparatus of the present invention comprises a vertical cylindrical column having a top end which is provided with a mounting support for the material (i.e., ladle) to be weighed, a guide tube coaxial with the column, a rotatable sleeve between the guide tube and the column, upper and lower bearing elements between the column and the sleeve, and upper and lower bearing elements between the sleeve and the guide tube.

The above discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES.

FIG. 2 is a plan view of the apparatus shown in FIG. 1.

DESCRIPTION OF THE PREFERRED EMBODIMENT

Figure 1:
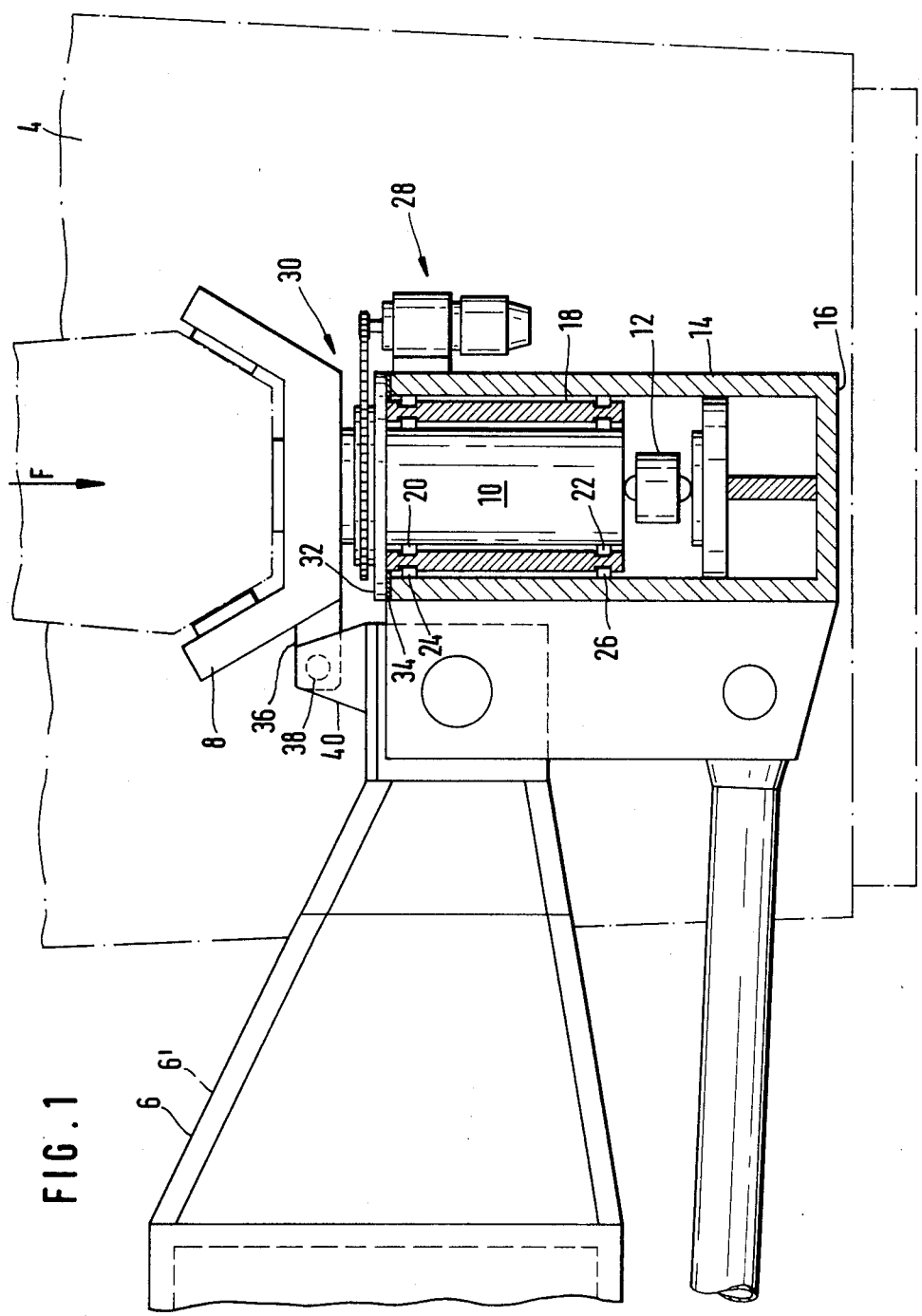
FIG. 1 is a front view, partly in cross section, of a weighing apparatus on the overhanging arm of a revolving turret for ladles.

Referring first to FIG. 1, the lower portion of casting ladle 4 is shown in dot-and-dash lines and suspended on both sides of forked arm 6,6', forked arm 6,6' extending from a revolving turret (not shown) such as the revolving turret disclosed in U.S. Pat. No. 4,436,293. The heavy load weighing system of the present invention essentially consists of support structure 8 resting on a column 10, column 10 being integral with support 8, and disposed on a pressure cell 12. In order to keep the cylindrical column 10 vertical, it has to be supported in the horizontal direction by a vertical guide. In accordance with the present invention, this vertical guide support is accomplished by means of both a vertical guide tube 14 attached to the end of overhanging arm 6 and by coaxial, normally rotating sleeve 18 positioned between column 10 and tube 14. In the illustrated and preferred embodiment, tube 14 terminates at floor portion 16, thereby forming a capped cylinder or cup shape. The mounting system for sleeve 18 is formed by upper and lower bearing elements 20 and 22 disposed between column 10 and sleeve 18, and also by upper and lower bearing elements 24 and 26 disposed between sleeve 18 and the cup-shaped guide tube 14. Preferably, the rolling elements 20, 22, 24 and 26 consist of ball bearings or cylindrical rollers and run, for example, in grooves provided on sleeve 18. Sleeve 18 is driven by a geared motor 28, preferably via a chain drive 30. A rotatable cover 32, which rotates with sleeve 18 is provided on the top of cup-shaped guide tube 14 along with a sealing device 34. Sealing device 34 (i.e. gasket material) prevents foreign matter from entering cup-shaped tube 14. When ladle 4 has been removed from support structure 8, the rotation of column 10 is prevented by a lug 36 provided on support 8 and resting, via supporting elements 38,38' (see FIG. 2) on crosspieces 40,40' of the overhanging arm 6. Note that slight vertical movements of the lug 36 and consequently of the support 8 and column 10 are not impeded thereby.

During a typical casting operation, if the force F does not act in the direction shown by the arrow in FIG. 1, i.e., on the axis of the pressure cell 12, but instead in a direction parallel thereto, then the bearing elements 20, 22, 24 and 26 will be subjected to horizontal supporting forces which, in the event of vertical movements of the column 10, will generate frictional forces which falsify the weighing result.

EXAMPLE

For example, with a force F of 2,300 kN and a parallel displacement thereof amounting to 5 cm, the horizontal force obtained with a weighing apparatus constructed in accordance with the present invention is found to be approximately 200 kN. With the sleeve 18 rotating, the coefficient of sliding between column 10 and bearings 20 and 22 is found to be 0.002, resulting in a vertical frictional force $F_y$ of $0.002 \times 220$, $N = 0.44$ kN. This represents a weighing error of:

$$\frac{0.44 \ kN \times 100}{2,300 \ kN} \ 0.02\%$$

By comparison with prior art weighing systems, which as mentioned, are only accurate to within between 1% and 0.1% (this latter degree of accuracy being very difficult to achieve), the foregoing results represent a significant improvement in accuracy. Moreover, in most cases this low error has been maintained even when sleeve 18 is not rotating. The coefficient of adhesive friction $\mu_0$ thus obtained, with the resulting vertical frictional forces then occuring, amounts to about 0.005, so that using the identical figures mentioned above, the result is $0.005 \times 220$ kN $= 1.1$ kN.

The rotational speed selected for sleeve 18 will preferably amount to between about 10 and 100 rpm. It will be appreciated that while the stationary sleeve may provide sufficiently accurate weighing results, the rotational sleeve offers the advantage of ensuring that the wear resulting from the horizontal forces acting on the sleeve will be evenly distributed over the entire periphery of the sleeve.

If the particular weighing error of, for example, 0.44 kN discussed hereinabove or any other degree of error, remains constant, then the error can be easily eliminated, by taking it into account in the calibration of the weight indicators.

It will be understood that while the present invention has been described by reference to the process of weighing a ladle, it is not limited to that application. Thus, for example, the support structure 8 can be replaced by a platform accommodating the material to be weighed. It is then also possible for the pressure cell 12 to be replaced by a number of equal pressure cells between the lower side of the platform and a number of fixed points, such as foundations (not shown in the drawing). The floor 16 can then be eliminated.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A weighing apparatus for heavy loads comprising:
   a vertical cylindrical column having a first end, said first end being provided with mounting support means for supporting the load to be weighed;
   guide tube means coaxial with said column;
   rotatable sleeve means being positioned between said guide tube means and said column;
   first bearing means being disposed between said column and said sleeve means;
   second bearing means being disposed between said sleeve means and said guide tube means; and
   weighing means, said weighing means disposed beneath a second end of said cylindrical column.

2. The weighing apparatus of claim 1 further comprising:
   a geared motor; and
   transmission gearing being between said sleeve means and said motor wherein said sleeve means is rotated.

3. The weighing apparatus of claim 2 wherein:
   said transmission gearing is a chain drive.

4. The weighing apparatus of claim 1 further comprising:
   means for preventing said column and said mounting support means from rotating.

5. The weighing apparatus of claim 1 wherein said mounting support means includes:
   a support capable of supporting the suspension means of a casting ladle.

6. The weighing apparatus of claim 4 wherein said mounting support means includes:
   a support capable of supporting the suspension means of a casting ladle.

7. The weighing apparatus of claim 1 wherein said weighing means includes:
   at least one pressure cell which is coaxial with said column.

8. The weighing apparatus of claim 1 wherein said bearing means comprises:
   rolling elements.

9. The weighing apparatus of claim 1 wherein said bearing means comprises:
   ball bearings.

10. The weighing apparatus of claim 1 including:
    grooves provided on said sleeve, and wherein said bearing means is disposed in said grooves.

11. The weighing apparatus of claim 1 wherein said guide tube means includes:
    a floor portion wherein said guide tube has a cup-shape.

12. The weight apparatus of claim 1 wherein said guide tube means includes:
    rotatable cover means.

13. The weight apparatus of claim 11 wherein said guide tube means includes:
    rotatable cover means.

14. The weighing apparatus of claim 12 including:
    sealing means disposed between said cover means and said guide tube means.

15. The weighing apparatus of claim 13 including:
    sealing means disposed between said cover means and said guide tube means.

* * * * *